(12) United States Patent
Yasui

(10) Patent No.: US 12,024,194 B2
(45) Date of Patent: Jul. 2, 2024

(54) VEHICLE CONTROL METHOD, VEHICLE CONTROL DEVICE, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 17/210,566

(22) Filed: Mar. 24, 2021

(65) Prior Publication Data

US 2021/0300415 A1 Sep. 30, 2021

(30) Foreign Application Priority Data

Mar. 31, 2020 (JP) .................................. 2020-063096

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 40/04* (2013.01);
(Continued)

(58) Field of Classification Search
CPC ......... B60W 60/0011; B60W 30/0956; B60W 40/04; B60W 40/105; B60W 60/00274;
(Continued)

(56) References Cited

U.S. PATENT DOCUMENTS

| 8,005,616 B2 * | 8/2011 | Beuschel | B60W 40/10 340/436 |
| 9,766,626 B1 * | 9/2017 | Zhu | G01S 13/931 |

(Continued)

FOREIGN PATENT DOCUMENTS

| CN | 108974009 | 12/2018 |
| CN | 109313857 | 2/2019 |

(Continued)

OTHER PUBLICATIONS

Japanese Notice of Allowance for Japanese Patent Application No. 2020-063096 dated Oct. 3, 2023.

(Continued)

*Primary Examiner* — Mohamed Abdo Algehaim
(74) *Attorney, Agent, or Firm* — Amin, Turocy & Watson, LLP

(57) ABSTRACT

A vehicle control method includes recognizing an object, generating plurality of target trajectories which the vehicle travels using a plurality of models, and automatically controlling driving of the vehicle based on the target trajectory, the plurality of models include a first model which is a rule based model or a model based model, and a second model which is a machine learning based model, and the second target trajectory is selected, when the vehicle accelerates after a speed of the vehicle has been equal to or smaller than a predetermined value, under a condition in which driving of the vehicle is controlled based on a first target trajectory output by the first model and under a condition in which driving of the vehicle is controlled based on a second target trajectory output by the second model.

5 Claims, 12 Drawing Sheets

(51) Int. Cl.
 *B60W 40/04* (2006.01)
 *B60W 40/105* (2012.01)
 *G06N 20/00* (2019.01)
 *G06V 20/58* (2022.01)

(52) U.S. Cl.
 CPC .... *B60W 40/105* (2013.01); *B60W 60/00274* (2020.02); *G06N 20/00* (2019.01); *G06V 20/58* (2022.01); *B60W 2520/105* (2013.01); *B60W 2554/80* (2020.02)

(58) Field of Classification Search
 CPC ....... B60W 2520/105; B60W 2554/80; B60W 2520/10; B60W 30/09; B60W 30/0953; B60W 60/001; B60W 30/08; B60W 60/0016; G06N 20/00; G06N 3/042; G06N 3/045; G06N 3/08; G06N 3/044; G06N 3/048; G06N 5/047; G06V 20/58; G06V 20/56
 USPC .......................................................... 701/26
 See application file for complete search history.

(56) References Cited

U.S. PATENT DOCUMENTS

| | | | | |
|---|---|---|---|---|
| 10,156,850 | B1* | 12/2018 | Ansari | B60W 30/0956 |
| 10,671,079 | B2* | 6/2020 | Russell | G08G 1/166 |
| 11,392,127 | B2* | 7/2022 | Akella | G08G 1/166 |
| 11,414,075 | B2* | 8/2022 | Takahashi | G01C 21/3446 |
| 11,548,509 | B2* | 1/2023 | Park | G05D 1/0223 |
| 2013/0297169 | A1* | 11/2013 | Konishi | G06F 17/00 701/70 |
| 2015/0224992 | A1* | 8/2015 | Dornieden | B60W 30/143 701/1 |
| 2015/0294430 | A1* | 10/2015 | Huang | G06Q 50/26 701/2 |
| 2015/0375743 | A1* | 12/2015 | Izuhara | B60W 30/18145 701/36 |
| 2016/0280223 | A1* | 9/2016 | Aoki | G06V 20/58 |
| 2017/0057496 | A1* | 3/2017 | Toyoda | G06V 20/584 |
| 2017/0101096 | A1* | 4/2017 | Kim | B60W 30/18163 |
| 2017/0327121 | A1* | 11/2017 | Eisenhour | B60W 30/1886 |
| 2018/0348763 | A1* | 12/2018 | Jiang | B60W 30/00 |
| 2019/0012910 | A1* | 1/2019 | Kuffner, Jr. | G08G 1/166 |
| 2019/0287403 | A1* | 9/2019 | Aoude | G08G 1/0116 |
| 2019/0315359 | A1* | 10/2019 | Park | B60W 50/10 |
| 2019/0317520 | A1* | 10/2019 | Zhang | G05D 1/0221 |
| 2019/0333386 | A1* | 10/2019 | Horita | G08G 1/166 |
| 2019/0382013 | A1 | 12/2019 | Li et al. | |
| 2020/0019175 | A1* | 1/2020 | Dean | G06N 7/01 |
| 2020/0117199 | A1* | 4/2020 | Akella | G08G 1/166 |
| 2020/0117200 | A1* | 4/2020 | Akella | G05D 1/0088 |
| 2020/0125106 | A1* | 4/2020 | Russell | B60W 60/0011 |
| 2020/0126239 | A1* | 4/2020 | Qian | G01S 5/16 |
| 2020/0156631 | A1* | 5/2020 | Lin | B60W 30/0956 |
| 2020/0180611 | A1* | 6/2020 | Klingemann | B60W 50/14 |
| 2020/0223449 | A1* | 7/2020 | Tsuji | G08G 1/096758 |
| 2020/0231150 | A1* | 7/2020 | Takahashi | G07C 5/008 |
| 2020/0231151 | A1* | 7/2020 | Aoki | B62D 15/0255 |
| 2020/0233414 | A1* | 7/2020 | Akella | G06V 20/584 |
| 2020/0272160 | A1* | 8/2020 | Djuric | G06T 7/20 |
| 2020/0282997 | A1* | 9/2020 | Ueda | B60W 30/18163 |
| 2021/0107513 | A1* | 4/2021 | Goto | B60W 10/20 |
| 2021/0223790 | A1* | 7/2021 | Park | G05D 1/0219 |
| 2021/0237769 | A1* | 8/2021 | Ostafew | G08G 1/163 |
| 2021/0394749 | A1* | 12/2021 | Horigome | B60W 60/001 |
| 2022/0048513 | A1* | 2/2022 | Xu | B60W 60/00274 |
| 2022/0121213 | A1* | 4/2022 | Hsu | B60W 30/18163 |
| 2022/0126822 | A1* | 4/2022 | Wang | B60W 30/18159 |

FOREIGN PATENT DOCUMENTS

| | | |
|---|---|---|
| EP | 3508391 | 7/2019 |
| JP | 2017-202802 | 11/2017 |
| JP | 2019-108124 | 7/2019 |
| JP | 2019-119447 | 7/2019 |
| JP | 2019-214318 | 12/2019 |
| JP | 2020-142766 | 9/2020 |
| WO | 2019/167247 | 9/2019 |

OTHER PUBLICATIONS

Chinese Office Action for Chinese Patent Application No. 202110337333.3 dated Sep. 26, 2023.

* cited by examiner

VEHICLE CONTROL METHOD, VEHICLE CONTROL DEVICE, AND STORAGE MEDIUM

CROSS-REFERENCE TO RELATED APPLICATION

Priority is claimed on Japanese Patent Application No. 2020-063096, filed Mar. 31, 2020, the content of which is incorporated herein by reference.

BACKGROUND OF THE INVENTION

Field of the Invention

The present invention relates to a vehicle control method, a vehicle control device, and a storage medium.

Description of Related Art

A technology of generating a target trajectory along which a vehicle is to travel in the future is known (for example, Japanese Unexamined Patent Application, First Publication No. 2019-108124).

SUMMARY OF THE INVENTION

However, in the related art, in some cases, target trajectories that do not match the surrounding conditions may be generated. As a result, driving of the vehicle may not be smoothly controlled.

An aspect of the present invention is directed to providing a vehicle control method, a vehicle control device, and a storage medium that are capable of smoothly controlling driving of a vehicle.

A vehicle control method, a vehicle control device, and a storage medium according to the present invention employ the following configurations.

A first aspect of the present invention is a vehicle control method including: recognizing an object present around the vehicle; calculating a region of a risk distributed around the recognized object; inputting the calculated region to each of a plurality of models that output a target trajectory along which the vehicle is to travel when the region is input, and generating a plurality of target trajectories on the basis of an output result of each of the plurality of models to which the region has been input; and automatically controlling driving of the vehicle on the basis of the generated target trajectory, wherein the plurality of models include a first model which is a rule based model or a model based model that outputs the target trajectory from the region, and a second model which is a machine learning based model learned to output the target trajectory when the region is input, and the second target trajectory is selected from the first target trajectory and the second target trajectory in a case the vehicle accelerates after a speed of the vehicle has been equal to or smaller than a predetermined value under a first condition and in a case the vehicle accelerates after a speed of the vehicle has been equal to or smaller than the predetermined value under a second condition, the first condition being a condition in which driving of the vehicle is controlled based on a first target trajectory that is the target trajectory output by the first model, the second condition being a condition in which driving of the vehicle is controlled based on a second target trajectory that is the target trajectory output by the second model.

According to a second aspect, in the first aspect, further includes: predicting a future trajectory of the recognized object, and in a case the future trajectory of the object crosses the target trajectory of the vehicle, a determination is made that the vehicle will accelerate after a speed of the vehicle has been equal to or smaller than the predetermined value under the first condition and that the vehicle will accelerate after a speed of the vehicle has been equal to or smaller than the predetermined value under the second condition.

According to a third aspect, in the first or second aspect, the predetermined value is zero, and the second target trajectory is selected among the first target trajectory and the second target trajectory in a case an acceleration of the vehicle is within a predetermined range after a speed of the vehicle has been stopped under the first condition and an acceleration of the vehicle is within a predetermined range after a speed of the vehicle has been stopped under the second condition.

A fourth aspect is a vehicle control device including: a recognition part configured to recognize an object present around a vehicle; a calculating part configured to calculate a region of a risk distributed around the object recognized by the recognition part; a generating part configured to input the region calculated by the calculating part to each of a plurality of models that output a target trajectory along which the vehicle is to travel when the region is input, and generate a plurality of target trajectories on the basis of an output result of each of the plurality of models to which the region has been input; and a driving controller configured to automatically control driving of the vehicle on the basis of the target trajectory generated by the generating part, wherein the plurality of models include a first model which is rule-based model or model-based model that outputs the target trajectory from the region, and a second model which is a machine learning based model learned to output the target trajectory when the region is input, and the generating part selects a second target trajectory among a first target trajectory and a second target trajectory in a case the vehicle accelerates after a speed of the vehicle has been equal to or smaller than a predetermined value under a first condition and in a case the vehicle accelerates after a speed of the vehicle has been equal to or smaller than the predetermined value under a second condition, the first condition being a condition in which driving of the vehicle is controlled based on a first target trajectory that is the target trajectory output by the first model, the second condition being a condition in which driving of the vehicle is controlled based on a second target trajectory that is the target trajectory output by the second model.

A fifth aspect is a computer-readable storage medium on which a program is stored to execute a computer mounted on a vehicle to: recognize an object present around the vehicle; calculate a region of a risk distributed around the recognized object; input the calculated region to each of a plurality of models that output a target trajectory along which the vehicle is to travel when the region is input, and generate a plurality of target trajectories on the basis of an output result of each of the plurality of models to which the region has been input; and automatically control driving of the vehicle on the basis of the generated target trajectory, wherein the plurality of models include a first model which is rule-based model or model-based model that outputs the target trajectory from the region, and a second model which is a machine learning based model learned to output the target trajectory when the region is input, and the generating part selects a second target trajectory among a first target trajectory and a second target trajectory in a case the vehicle accelerates after a speed of the vehicle has been equal to or smaller than a predetermined value under a first condition and in a case the vehicle accelerates after a speed of the vehicle has been equal to or smaller than the predetermined value under a second condition, the first condition being a condition in which driving of the vehicle is controlled based on a first target trajectory that is the target trajectory output by the first model, the second condition being a condition in which driving of the vehicle is controlled based on a second target trajectory that is the target trajectory output by the second model.

According to any one of the above-mentioned aspects, it is possible to smoothly control driving of a vehicle by generating a target trajectory appropriate for surrounding circumstances.

DETAILED DESCRIPTION OF THE INVENTION

Hereinafter, embodiments of a vehicle control device, a vehicle control method, and a program of the present invention will be described with reference to the accompanying drawings. The vehicle control device of the embodiment is applied to, for example, an automatic traveling vehicle. Automatic traveling is, for example, controlling driving of the vehicle by controlling one or both of a speed or steering of the vehicle. The above-mentioned driving control of the vehicle includes various types of driving control, for example, an adaptive cruise control system (ACC), a traffic jam pilot (TJP), auto lane changing (ALC), a collision mitigation brake system (CMBS) or a lane keeping assistance system (LKAS). Driving of the automatic traveling vehicle may be controlled by manual driving of an occupant (a driver).

[Entire Configuration]

Figure 1:
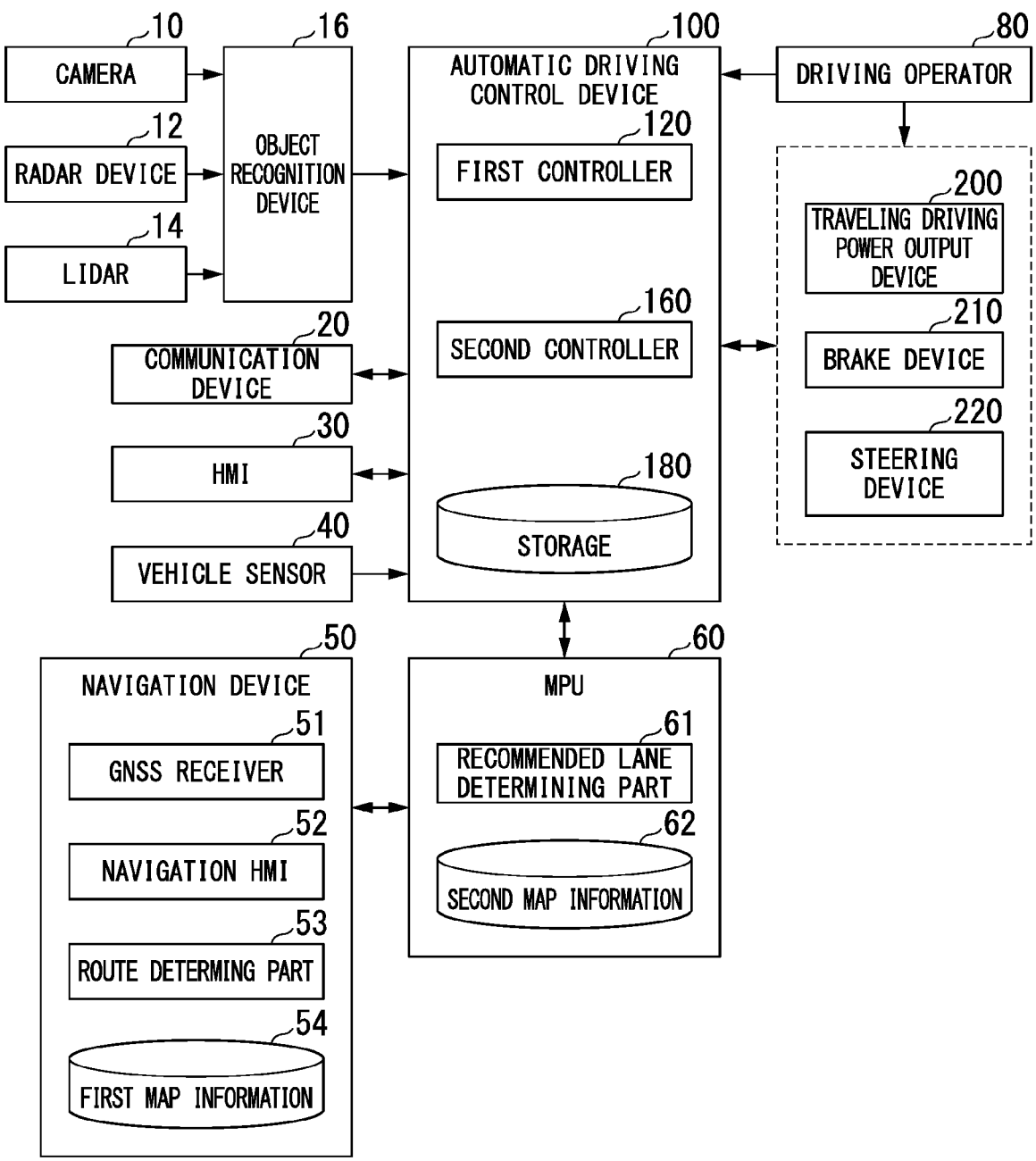
FIG. 1 is a configuration view of a vehicle system using a vehicle control device according to an embodiment.

FIG. 1 is a configuration view of a vehicle system 1 using a vehicle control device according to the embodiment. A vehicle on which the vehicle system 1 is mounted (hereinafter, referred to as a host vehicle M) is, for example, a two-wheeled, three-wheeled, or four-wheeled vehicle, and a driving source thereof is an internal combustion engine such as a diesel engine, a gasoline engine, or the like, an electric motor, or a combination of these. The electric motor is operated using an output generated by a generator connected to the internal combustion engine, or discharged energy of a secondary battery or a fuel cell.

The vehicle system 1 includes, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automatic driving control device 100, a traveling driving power output device 200, a brake device 210, and a steering device 220. These devices or instruments are connected to each other by a multiple communication line such as a controller area network (CAN) communication line or the like, a serial communication line, a wireless communication network, or the like. The configuration shown in FIG. 1 is merely an example, a part of the configuration may be omitted, and another configuration may be added. The automatic driving control device 100 is an example of "a vehicle control device."

The camera 10 is, for example, a digital camera using a solid-state image sensing device such as a charge coupled device (CCD), a complementary metal oxide semiconductor (CMOS), or the like. The camera 10 is attached to an arbitrary place of the host vehicle M. For example, when a side in front of the host vehicle M is imaged, the camera 10 is attached to an upper section of a front windshield, a rear surface of a rearview mirror, or the like. In addition, when a side behind the host vehicle M is imaged, the camera 10 is attached to an upper section of a rear windshield, or the like. In addition, when the right side or the left side of the host vehicle M is imaged, the camera 10 is attached to a right side surface or a left side surface of a vehicle body or a door mirror. The camera 10 images surroundings of the host vehicle M, for example, periodically and repeatedly. The camera 10 may be a stereo camera.

The radar device 12 radiates radio waves such as millimeter waves or the like to surroundings of the host vehicle M, and simultaneously, detects the radio waves (reflected waves) reflected by the object to detect a position (a distance and an azimuth) of at least the object. The radar device 12 is attached to an arbitrary place of the host vehicle M. The radar device 12 may detect a position and a speed of the object using a frequency modulated continuous wave (FM-CW) method.

The LIDAR 14 radiates light to surroundings of the host vehicle M, and measures the scattered light of the radiated light. The LIDAR 14 detects a distance to a target on the basis of a time from emission to reception of light. The radiate light is, for example, a pulse-shaped laser beam. The LIDAR 14 is attached to an arbitrary place of the host vehicle M.

The object recognition device 16 recognizes a position, a type, a speed, or the like, of the object by performing sensor fusion processing with respect to the detection result by some or all of the camera 10, the radar device 12, and the LIDAR 14. The object recognition device 16 outputs the recognized result to the automatic driving control device 100. In addition, the object recognition device 16 may output the detection results of the camera 10, the radar device 12 and the LIDAR 14 directly to the automatic driving control device 100. In this case, the object recognition device 16 may be omitted from the vehicle system 1.

The communication device 20 uses, for example, a cellular network, a Wi-Fi network, a Bluetooth (registered trademark), dedicated short range communication (DSRC), or the like, comes in communication with another vehicle present in the vicinity of the host vehicle M, or comes in communication with various server devices via a radio base station.

The HMI 30 receives an input operation by an occupant in the host vehicle M while providing various types of information to the occupant (including a driver). The HMI 30 includes, for example, a display, a speaker, a buzzer, a touch panel, a microphone, a switch, a key, or the like.

The vehicle sensor 40 includes a vehicle speed sensor configured to detect a speed of the host vehicle M, an acceleration sensor configured to detect an acceleration, a yaw rate sensor configured to detect an angular speed around a vertical axis, and an azimuth sensor configured to detect an orientation of the host vehicle M.

The navigation device 50 includes, for example, a global navigation satellite system (GNSS) receiver 51, a navigation HMI 52, and a route determining part 53. The navigation device 50 holds first map information 54 in a storage device such as a hard disk drive (HDD) a flash memory, or the like.

The GNSS receiver 51 specifies a position of the host vehicle M on the basis of a signal received from the GNSS satellite. The position of the host vehicle M may be specified or complemented by an inertial navigation system (INS) that uses output of the vehicle sensor 40.

The navigation HMI 52 includes a display device, a speaker, a touch panel, a key, and the like. The navigation HMI 52 may be partially or entirely shared with the HMI 30 described above. For example, the occupant may input a destination of the host vehicle M to the navigation HMI 52 instead of (or in addition to) inputting the destination of the host vehicle M to the HMI 30.

The route determining part 53 determines, for example, a route (hereinafter, a route on a map) from a position of the host vehicle M specified by the GNSS receiver 51 (or an input arbitrary position) to a destination input by an occupant using the HMI 30 or the navigation HMI 52 with reference to the first map information 54.

The first map information 54 is, for example, information in which a road shape is expressed by a link showing a road and a node connected by the link. The first map information 54 may include a curvature of a road, point of interest (POI) information, or the like. The route on a map is output to the MPU 60.

The navigation device 50 may perform route guidance using the navigation HMI 52 on the basis of the route on a map. The navigation device 50 may be realized by, for example, a function of a terminal device such as a smart phone, a tablet terminal, or the like, held by the occupant. The navigation device 50 may transmit the current position and the destination to the navigation server via the communication device 20, and acquire the same route as the route on a map from the navigation server.

The MPU 60 includes, for example, a recommended lane determining part 61, and holds second map information 62 in a storage device such as an HDD, a flash memory, or the like. The recommended lane determining part 61 divides the route on a map provided from the navigation device 50 into a plurality of blocks (for example, divided at each 100 [m] in an advance direction of the vehicle), and determines a recommended lane at each block with reference to the second map information 62. The recommended lane determining part 61 performs determination of which lane the vehicle travels from the left. The recommended lane determining part 61 determines a recommended lane such that the host vehicle M can travel a reasonable route so as to reach a branch destination when a diverging place is present on the route on a map.

The second map information 62 is map information that has a higher precision than the first map information 54. The second map information 62 includes, for example, information of a center of a lane, information of a boundary of a lane, or the like. In addition, the second map information 62 may include road information, traffic regulation information, address information (address/zip code), facility information, telephone number information, and the like. The second map information 62 may be updated at any time by bringing the communication device 20 in communication with another device.

The driving operator 80 includes, for example, an acceleration pedal, a brake pedal, a shift lever, a steering wheel, a modified steer, a joystick, and other operators. A sensor configured to detect an operation amount or existence of an operation is attached to the driving operator 80, and the detection result is output to some or all of the automatic driving control device 100, the traveling driving power output device 200, the brake device 210, and the steering device 220.

The automatic driving control device 100 includes, for example, a first controller 120, a second controller 160, and a storage 180. The first controller 120 and the second controller 160 are realized by executing a program (software) using a hardware processor such as a central processing unit (CPU), a graphics processing unit (GPU) or the like. Some or all of these components may be realized by hardware (a circuit part; including a circuitry) such as large scale integration (LSI), an application specific integrated circuit (ASIC), a field-programmable gate array (FPGA), or the like, or may be realized by cooperation of software and hardware. The program may be previously stored in a storage device (a storage device including a non-transient storage medium) such as an HDD, a flash memory, or the like, of the automatic driving control device 100, stored in a detachable storage medium such as a DVD, a CD-ROM, or the like, or installed on an HDD or a flash memory of the automatic driving control device 100 by mounting a storage medium on a drive device (a non-transient storage medium).

The storage 180 is realized by the above-mentioned various types of storage devices. The storage 180 is realized by, for example, an HDD, a flash memory, an electrically erasable programmable read only memory (EEPROM), a read only memory (ROM), a random access memory (RAM), or the like. Rule based model data 182 or deep neural network (DNN(s)) model data 184, or the like, is stored in the storage 180, for example, in addition to the program read and executed by the processor. The rule based model data 182 or the DNN model data 184 will be described below in detail.

Figure 2:
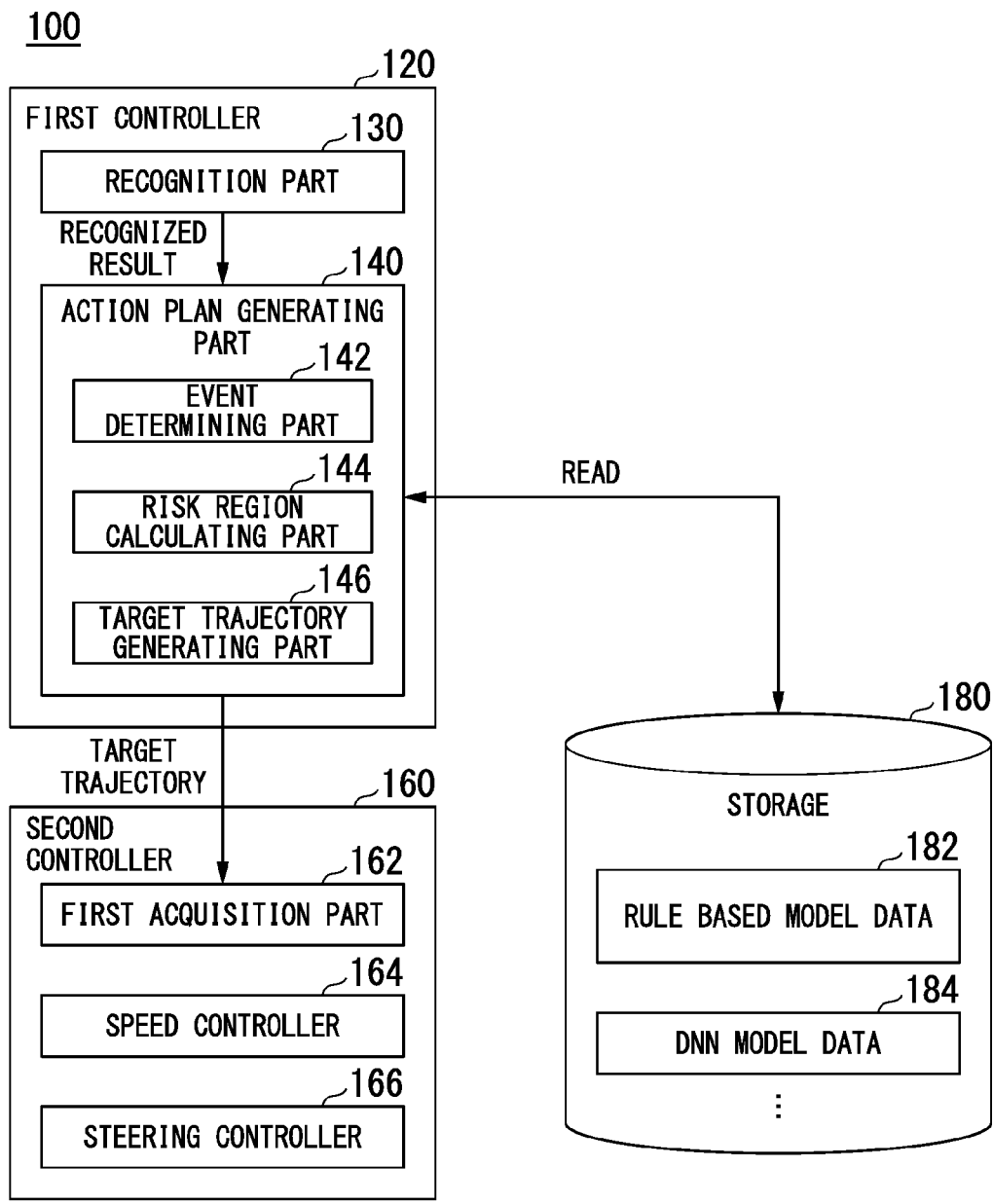
FIG. 2 is a functional configuration view of a first controller, a second controller, and a storage according to the embodiment.

FIG. 2 is a functional configuration view of the first controller 120, the second controller 160 and the storage 180 according to the embodiment. The first controller 120 includes, for example, a recognition part 130 and an action plan generating part 140.

The first controller 120 realizes, for example, both of a function of artificial intelligence (AI) and a function of a previously provided model at the same time. For example, a function of "recognizing a crossroad" is executed parallel to recognition of a crossroad through deep learning or the like and recognition based on a previously provided condition (a signal that enables matching of patterns, road markings, or the like), and may be realized by scoring and comprehensively evaluating them. Accordingly, reliability of automatic driving is guaranteed.

The recognition part 130 recognizes a situation or an environment of surroundings of the host vehicle M. For example, the recognition part 130 recognizes an object present around the host vehicle M on the basis of information input from the camera 10, the radar device 12, and the LIDAR 14 via the object recognition device 16. The object recognized by the recognition part 130 includes, for example, a bicycle, a motorcycle, a four-wheeled automobile, a pedestrian, road signs, road markings, road marking lines, electric poles, a guardrail, falling objects, or the like. In addition, the recognition part 130 recognizes a state such as a position, a speed, an acceleration, or the like, of the object. The position of the object is recognized as a position on relative coordinates (i.e., a relative position with respect to the host vehicle M) using, for example, a representative point (a center of gravity, a driving axial center, or the like) of the host vehicle M as an origin, and is used for control. The position of the object may be displayed at a representative point such as a center of gravity, a corner, or the like, of the object, or may be displayed as an expressed region. The "state" of the object may include an acceleration, a jerk, or "an action state" (for example, whether a lane change is performed or to be performed) of the object.

In addition, the recognition part 130 recognizes, for example, a lane in which the host vehicle M is traveling (hereinafter, a host lane), a neighboring lane adjacent to the host lane, or the like. For example, the recognition part 130 recognizes a space between road marking lines as a host lane or a neighboring lane by comparing a pattern (for example, arrangement of solid lines and broken lines) of road marking lines obtained from the second map information 62 with a pattern of road marking lines around the host vehicle M recognized from an image captured by the camera 10.

In addition, the recognition part 130 may recognize a lane such as a host lane or a neighboring lane by recognizing traveling lane boundaries (road boundaries) including road marking lines, road shoulders, curbstones, median strips, guardrails, and the like, while not being limited to road marking lines. In the recognition, the position of the host vehicle M acquired from the navigation device 50 or a processing result by the INS may be added. In addition, the recognition part 130 may recognize a temporary stop line, an obstacle, a red signal, a tollgate, and other road events.

The recognition part 130 recognizes a relative position or an attitude of the host vehicle M with respect to the host lane when the host lane is recognized. The recognition part 130 may recognize a separation from a lane center of a reference point of the host vehicle M and an angle of the host vehicle M with respect to a line that connects a lane center in an advance direction as a relative position and an attitude of the host vehicle M with respect to the host lane. Instead of this, the recognition part 130 may recognize a position or the like of a reference point of the host vehicle M with respect to any side end portion (a road marking line or a road boundary) of the host lane as a relative position of the host vehicle M with respect to the host lane.

The action plan generating part 140 includes, for example, an event determining part 142, a risk region calculating part 144 and a target trajectory generating part 146.

The event determining part 142 determines a traveling aspect of automatic traveling when the host vehicle M is automatically traveling on a route in which a recommended lane is determined. Hereinafter, information that defines a traveling aspect of the automatic traveling will be described while being referred to as an event.

The event includes, for example, a fixed speed traveling event, a following traveling event, a lane change event, a diverging event, a merging event, a take-over event, or the like. The fixed speed traveling event is a traveling aspect of causing the host vehicle M to travel along the same lane at a fixed speed. The following traveling event is a traveling aspect of causing the host vehicle M to follow another vehicle present within a predetermined distance in front of the host vehicle M on the host lane (for example, within 100 [m]) and closest to the host vehicle M (hereinafter, referred to as a preceding vehicle).

"Following" may be, for example, a traveling aspect of maintaining a constant inter-vehicle distance (a relative distance) between the host vehicle M and a preceding vehicle, or may be a traveling aspect of causing the host vehicle M to travel along a center of the host lane, in addition to maintaining the constant inter-vehicle distance between the host vehicle M and the preceding vehicle.

The lane change event is a traveling aspect of causing the host vehicle M to change lane from the host lane to a neighboring lane. The diverging event is a traveling aspect of causing the host vehicle M to move to a lane on the side of the destination at a diverging point of the road. The merging event is a traveling aspect of causing the host vehicle M to join a main line at a merging point. The take-over event is a traveling aspect of terminating automatic traveling and switching automatic driving to manual driving.

In addition, the event may include, for example, an overtaking event, an avoiding event, or the like. The overtaking event is a traveling aspect of causing the host vehicle M to change lane to a neighboring lane temporarily, overtake the preceding vehicle in the neighboring lane and change lane to the original lane again. The avoiding event is a traveling aspect of causing the host vehicle M to perform at least one of braking and steering to avoid an obstacle present in front of the host vehicle M.

In addition, for example, the event determining part 142 may change the event already determined with respect to the current section to another event, or determine a new event with respect to the current section according to a situation of the surroundings recognized by the recognition part 130 when the host vehicle M is traveling.

The risk region calculating part 144 calculates a risk region potentially distributed or present around the object recognized by the recognition part 130 (hereinafter, referred to as a risk region RA). The risk is, for example, a risk that an object exerts an influence on the host vehicle M. More specifically, the risk may be a risk of the host vehicle M being caused to brake suddenly because a preceding vehicle has suddenly slowed down or another vehicle has cut in front of the host vehicle M from a neighboring lane, or may be a risk of the host vehicle M being forced to be steered suddenly because a pedestrian or a bicycle has entered the roadway. In addition, the risk may be a risk that the host vehicle M will exert an influence on the object. Hereinafter, the level of such risk is treated as a quantitative index value, and the index value which will be described below is referred to as "a risk potential p."

Figure 3:
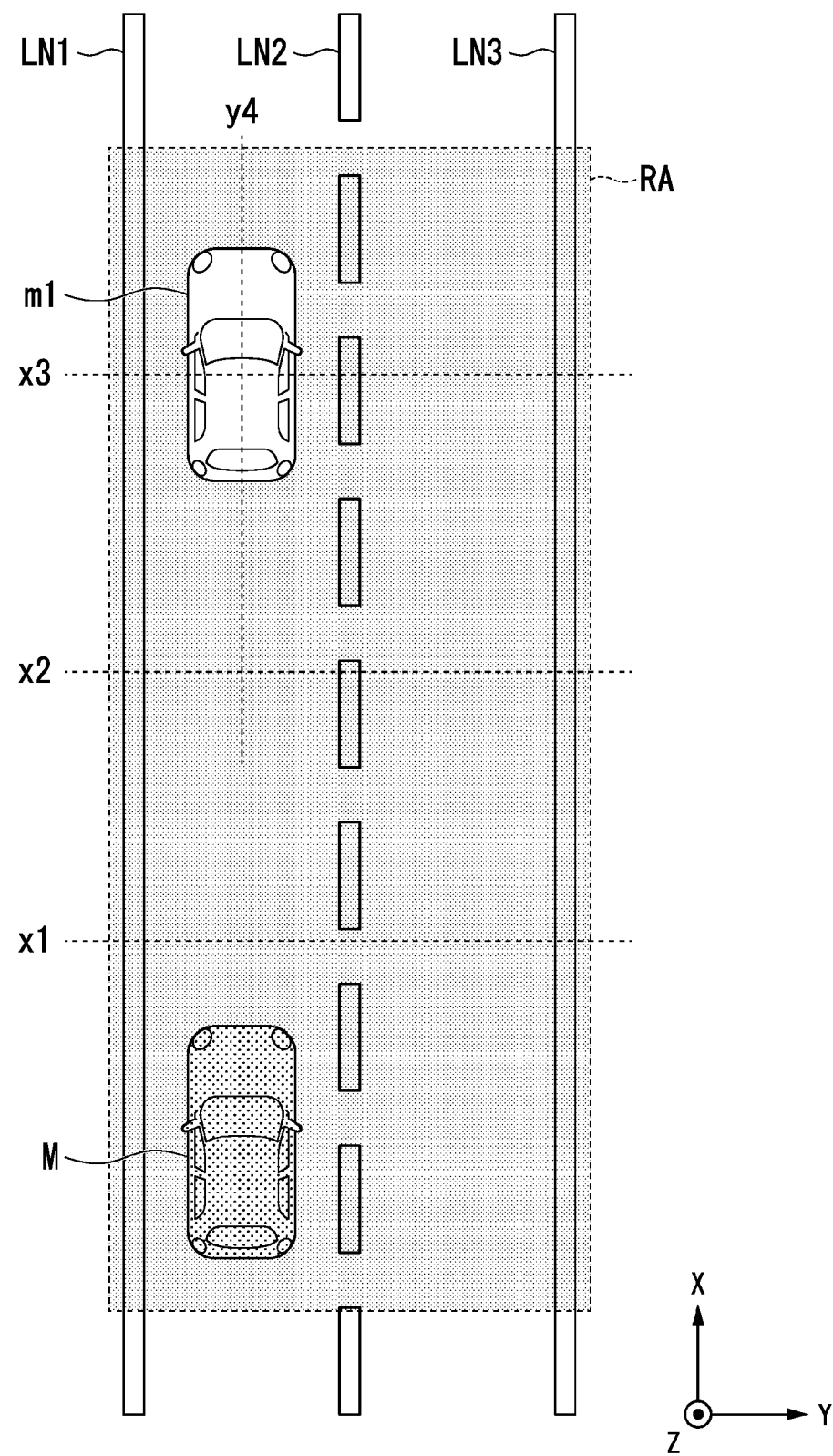
FIG. 3 is a view for describing a risk region.

FIG. 3 is a view for explaining the risk region RA. LN1 in the drawing designates a road marking line that partitions off the host lane on one side, and LN2 designates a road marking line that partitions off the host lane on the other side and a road marking line that partitions off a neighboring lane on one side. LN3 designates the other road marking line that divides the neighboring lane. In the plurality of road marking lines, LN1 and LN3 designate roadway edge markings, and LN2 designates a center line that vehicles are allowed to pass beyond when overtaking. In addition, in the example shown, a preceding vehicle m1 is present in front of the host vehicle M on the host lane. X in the drawings designates a direction in which the vehicle is advancing, Y designates a widthwise direction of the vehicle, and Z designates a vertical direction.

In the case of the situation shown, in the risk region RA, the risk region calculating part 144 increases the risk potential p in a region close to the roadway edge markings LN1 and LN3, and decreases the risk potential p in a region distant from the roadway edge markings LN1 and LN3.

In addition, in the risk region RA, the risk region calculating part 144 increases the risk potential p as it approaches the region close to the center line LN2 and decreases the risk potential p as it approaches the region far from the center line LN2. Since the center line LN2 is different from the roadway edge markings LN1 and LN3 and the vehicle is allowed to deviate from the center line LN2, the risk region calculating part 144 causes the risk potential p with respect to the center line LN2 to be lower than the risk potential p with respect to the roadway edge markings LN1 and LN3.

In addition, in the risk region RA, the risk region calculating part 144 increases the risk potential p as it approaches a region close to the preceding vehicle m1 that is one of an object, and decreases the risk potential p as it approaches a region far from the preceding vehicle m1. That is, in the risk region RA, the risk region calculating part 144 may increase the risk potential p as a relative distance between the host vehicle M and the preceding vehicle m1 becomes shorter, and may decrease the risk potential p as the relative distance between the host vehicle M and the preceding vehicle m1 becomes longer. Here, the risk region calculating part 144 may increase the risk potential p as an absolute speed or an absolute acceleration of the preceding vehicle m1 is increased. In addition, the risk potential p may be appropriately determined according to a relative speed or a relative acceleration between the host vehicle M and the preceding vehicle m1, a time to collision (TTC), or the like, instead of or in addition to the absolute speed or the absolute acceleration of the preceding vehicle m1.

Figure 4:
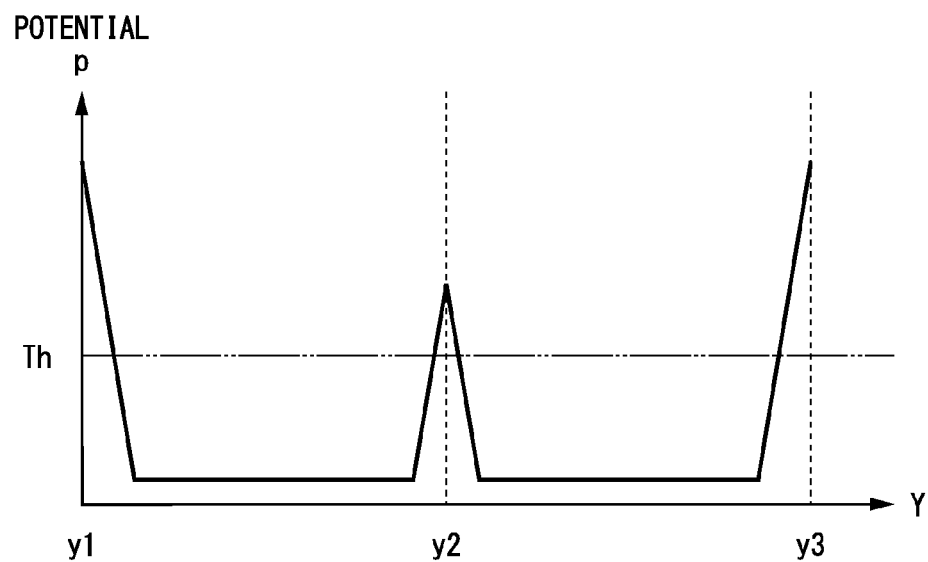
FIG. 4 is a view showing a variation in risk potential in a Y direction at a certain coordinate x1.

FIG. 4 is a view showing variation in the risk potential p in the Y direction at a certain coordinate x1. Here, y1 in the drawing designates a position (coordinate) of the roadway edge marking LN1 in the Y direction, y2 designates a position (coordinate) of the center line LN2 in the Y direction, and y3 designates a position (coordinate) of the roadway edge marking LN3 in the Y direction.

As shown, the risk potential p is highest in the vicinity of the coordinates (x1, y1) at which the roadway edge marking LN1 is present or in the vicinity of the coordinates (x1, y3) at which the roadway edge marking LN3 is present, and the risk potential p is the second highest in the vicinity of the coordinates (x1, y2) at which the center line LN2 is present after the coordinates (x1, y1) or (x1, y3). As described above, in a region in which the risk potential p is equal to or greater than a previously determined threshold Th, in order to prevent the vehicle from entering the region, the target trajectory TR is not generated.

Figure 5:
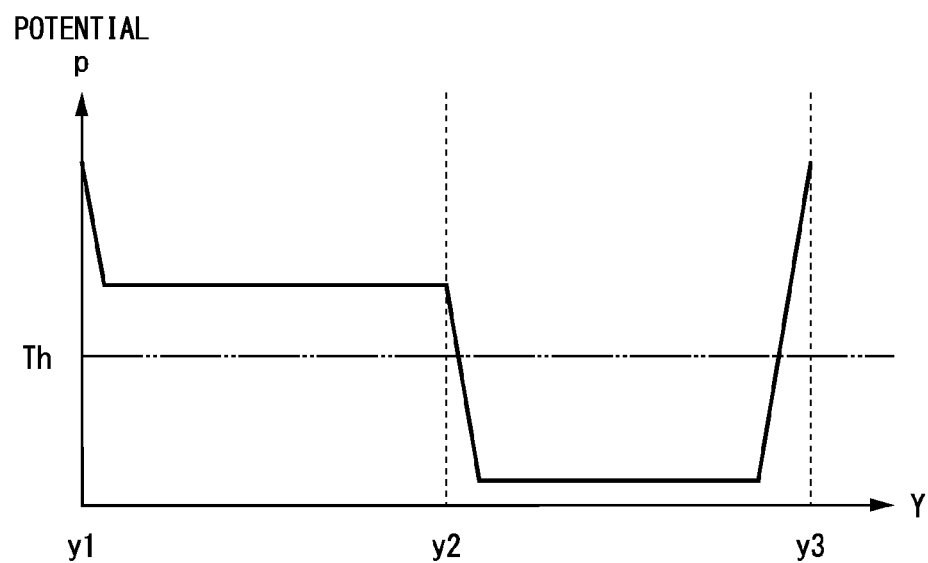
FIG. 5 is a view showing a variation in risk potential in a Y direction at a certain coordinate x2.

FIG. 5 is a view showing variation in the risk potential p in the Y direction at a certain coordinate x2. The coordinate x2 is closer to the preceding vehicle m1 than the coordinate x1 is. For this reason, although the preceding vehicle m1 is not present in the region between the coordinates (x2, y1) at which the roadway edge marking LN1 is present and the coordinates (x2, y2) at which the center line LN2 is present, a risk can be considered such as the sudden deceleration of the preceding vehicle m1 or the like. As a result, the risk potential p in the region between (x2, y1) and (x2, y2) tends to be higher than the risk potential p in the region between (x1, y1) and (x1, y2), for example, the threshold Th or more.

Figure 6:
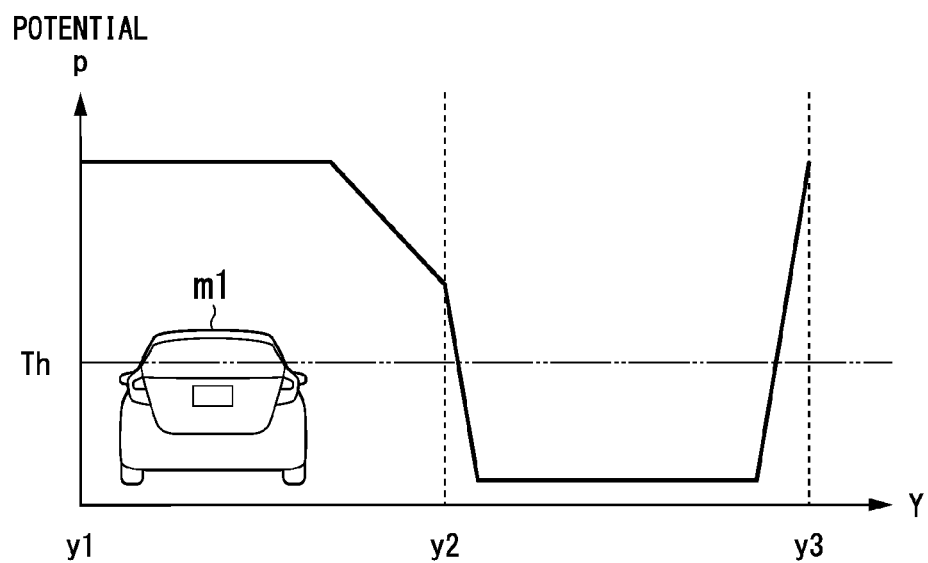
FIG. 6 is a view showing a variation in risk potential in a Y direction at a certain coordinate x3.

FIG. 6 is a view showing a variation in the risk potential p in the Y direction at a certain coordinate x3. The preceding vehicle m1 is present at the coordinate x3. For this reason, the risk potential p in the region between the coordinates (x3, y1) at which the roadway edge marking LN1 is present and the coordinates (x3, y2) at which the center line LN2 is present is higher than the risk potential p in the region between (x2, y1) and (x2, y2), and is equal to or greater than the threshold Th.

Figure 7:
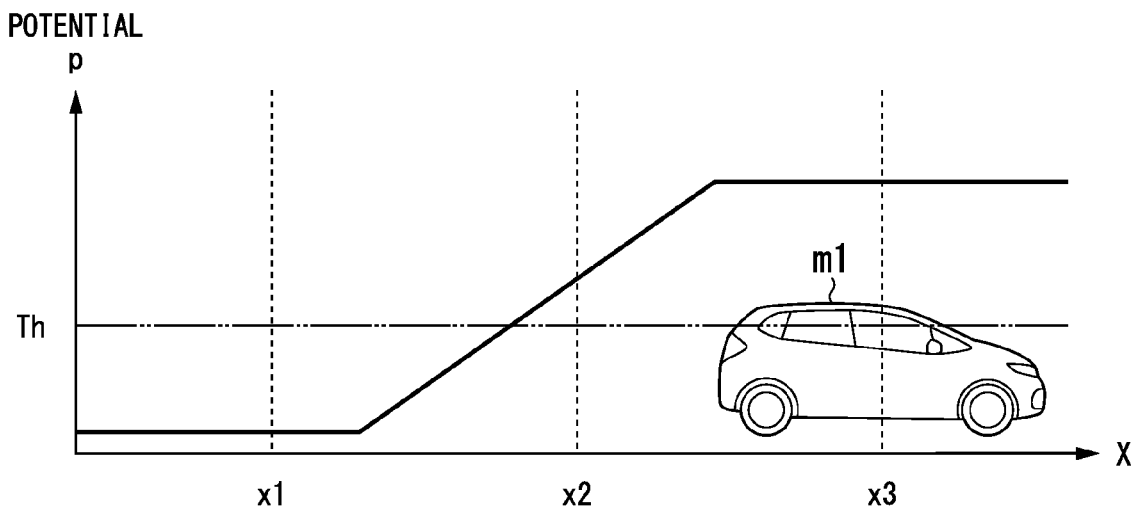
FIG. 7 is a view showing a variation in risk potential in an X direction at a certain coordinate x4.

FIG. 7 is a view showing a variation in the risk potential p in the X direction at a certain coordinate y4. The coordinate y4 are intermediate coordinates between y1 and y2, and the preceding vehicle m1 is present at the coordinate y4. For this reason, the risk potential p is highest at the coordinates (x3, y4), the risk potential p at the coordinates (x2, y4) farther from the preceding vehicle m1 than the coordinates (x3, y4) is lower than the risk potential p at the coordinates (x3, y4), and the risk potential p at the coordinates (x1, y4) farther from the preceding vehicle m1 than the coordinates (x2, y4) is lower than the risk potential p at the coordinates (x2, y4).

Figure 8:
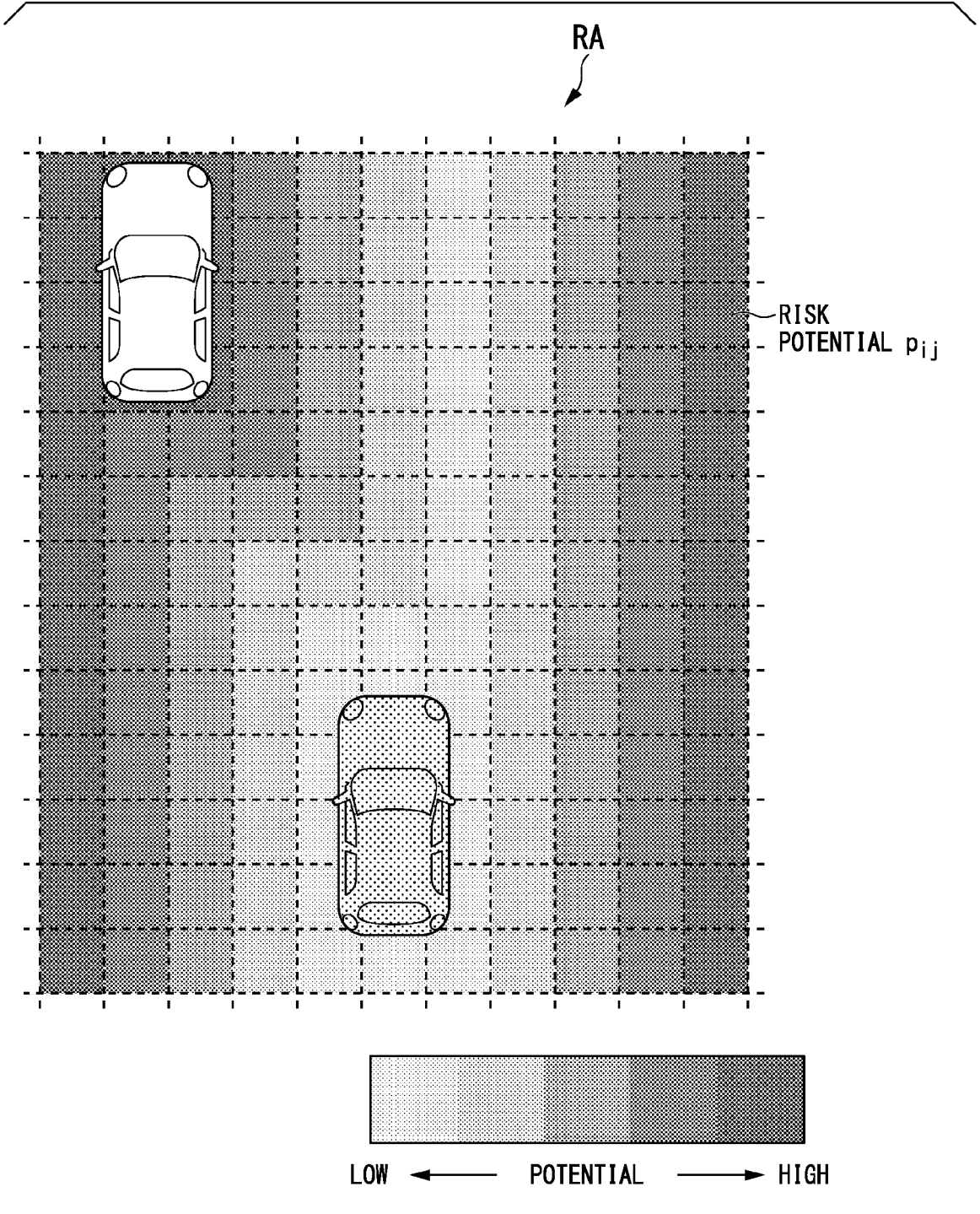
FIG. 8 is a view showing a risk region determined by a risk potential.

FIG. 8 is a view showing the risk region RA determined by the risk potential p. As shown, in the risk region calculating part 144, the risk region RA is divided into a plurality of mesh squares (also referred to as grid squares), and the risk potential p is associated with each of the plurality of mesh squares. For example, the risk potential $p_{ij}$ corresponds to the mesh square $(x_i, y_j)$. That is, the risk region RA is expressed by a data structure referred to as a vector or a tensor.

The risk region calculating part 144 normalizes the risk potential p of each mesh when the risk potential p corresponds to each of the plurality of meshes.

For example, the risk region calculating part 144 may normalize the risk potential p such that the maximum value of the risk potential p is 1 and the minimum value is 0. Specifically, the risk region calculating part 144 selects the risk potential $p_{max}$ that becomes the maximum value and the risk potential $p_{min}$ that becomes the minimum value among the risk potential p of all of the meshes included in the risk region RA. The risk region calculating part 144 selects one mesh $(x_i, y_j)$ of interest from all of the meshes included in the risk region RA, subtracts the minimum risk potential $p_{min}$ from the risk potential $p_{ij}$ corresponding to the mesh $(x_i, y_j)$, subtracts the minimum risk potential $p_{min}$ from the maximum risk potential $p_{max}$, and divides $(p_{ij}-p_{min})$ by $(p_{max}-p_{min})$. The risk region calculating part 144 repeats the above-mentioned processing while changing the mesh of interest. Accordingly, the risk region RA is normalized such that the maximum value of the risk potential p is 1 and the minimum value is 0.

In addition, the risk region calculating part 144 may calculate an average value $\mu$ and a standard deviation $\sigma$ of the risk potential p of all the meshes included in the risk region RA, subtract the average value μ from the risk potential $p_{ij}$ corresponding to the mesh $(x_i, y_j)$, and divide $(p_{ij}-μ)$ by the standard deviation σ. Accordingly, the risk region RA is normalized such that the maximum value of the risk potential p is 1 and the minimum value is 0.

In addition, the risk region calculating part 144 may normalize the risk potential p such that the maximum value of the risk potential p is an arbitrary M and the minimum value is an arbitrary m. Specifically, when $(p_{ij}-p_{min})/(p_{max}-p_{min})$ is A, the risk region calculating part 144 multiplies A by (M−m), and adds m to A (M−m). Accordingly, the risk region RA is normalized such that the maximum value of the risk potential p becomes M and the minimum value becomes m.

Returning to the description in FIG. 2, the target trajectory generating part 146 generates the future target trajectory TR to allow the host vehicle M to automatically travel (independently of an operation of the driver) in the traveling aspect defined by the event, such that the host vehicle M is able to travel in the recommended lane determined by the recommended lane determining part 61, and further, the host vehicle M is able to respond to the surrounding situation when traveling in the recommended lane. The target trajectory TR includes, for example, a position element that determines the position of the host vehicle M in the future, and a speed element that has determined the speed or the like of the host vehicle M in the future.

For example, the target trajectory generating part 146 determines a plurality of points (trajectory points) at which the host vehicle M should arrive in sequence as position elements of the target trajectory TR. The trajectory point is a point at which the host vehicle M should arrive after each of predetermined traveling distances (for example, about every several [m]). The predetermined traveling distance may be calculated, for example, according to a distance along a road when traveling on a route.

In addition, the target trajectory generating part 146 determines a target speed v and a target acceleration α for every predetermined sampling time (for example, about every several fractions of a [sec]) as a speed element of the target trajectory TR. In addition, the trajectory point may be a position at which the host vehicle M is to arrive in a sampling time for every predetermined sampling time. In this case, the target speed v or the target acceleration α is determined according to an interval of the sampling times and the trajectory points.

For example, the target trajectory generating part 146 reads the rule based model data 182, the DNN model data 184, or the like, from the storage 180, and generates the target trajectory TR using a model defined by the read data.

The rule based model data 182 is information (a program or a data structure) that defines one or a plurality of rule based models MDL1. The rule based model MDL1 is a model of deriving the target trajectory TR from the risk region RA on the basis of a rule group previously determined by an expert or the like. Such a rule based model MDL1 is also referred to as an expert system because the rule group is determined by an expert or the like. The rule group includes a law such as a road traffic law or the like, regulations, practices, or the like. The rule based models MDL1 is an example of "a first model."

For example, in the rule group, a rule to which a target trajectory TRx is uniquely associated in a certain condition X may exist. The condition X is, for example, the risk region RA input to the rule based models MDL1 is same as the risk region $RA_X$ that can be generated when the host vehicle M is traveling on a road having one lane on each side and a preceding vehicle with a speed of XX [km/h] is present within a predetermined distance in front of the host vehicle M. The target trajectory TRx is, for example, the target trajectory TR in which a target speed is $v_X$, a target acceleration is $α_X$, a displacement amount of steering is $u_X$, and a curvature of the trajectory is $κ_X$. According to such a rule, the rule based models MDL1 output the target trajectory TRx when the risk region RA that satisfies the condition X is input.

Although experts and others determine the rule group, it is rare that all kinds of rules are comprehensively determined. For this reason, it is also assumed that the host vehicle M is not present in the rule group (a circumstance not expected by the experts), and in some cases, the risk region RA that does not correspond to the rule group is entered to the rule based model MDL1. In this case, the rule based model MDL1 does not output the target trajectory TR. Instead of this, when the risk region RA that does not correspond to the rule group is input, the rule based model MDL1 may output the previously determined target trajectory TR that does not depend on the risk region RA in a current status such as traveling the current lane at a previously determined speed. That is, when the risk region RA that is not expected in advance is input, the rule group may include a general rule corresponding to an irregular circumstance such as outputting the previously determined target trajectory TR that does not depend on the risk region RA in the current status.

The DNN model data 184 is information (a program or a data structure) that define one or a plurality of DNN models MDL2. The DNN model MDL2 is a deep learning model learned to output the target trajectory TR when the risk region RA is input. Specifically, the DNN model MDL2 may be a convolutional neural network (CNN), a reccurent neural network (RNN), or a combination of these. The DNN model data 184 includes, for example, various types of information such as coupling information showing how units included in a plurality of layers constituting the neural network are coupled to each other, a coupling coefficient applied to the data input and output between the coupled units, or the like. The DNN model MDL2 is an example of "a second model."

The coupling information includes, for example, information that designates the number of units included in each layer, a type of a unit which is a coupling mate member of each of the units, or the like, and information of an activation function of each unit, a gate provided between the units of the hidden layer, or the like. The activation function may be, for example, a normalized linear function (an ReLU function), or may be a Sigmoid function, a step function, or the other functions. The gate selectively passes or weights the data transmitted between the units, for example, according to a value (for example, 1 or 0) returned by the activation function. The coupling coefficient includes, for example, a weight coefficient given to the output data when the data is output from a unit of a certain layer to a unit of a deeper layer in the hidden layer of the neural network. In addition, the coupling coefficient may include a bias element peculiar to each layer.

The DNN model MDL2 is sufficiently learned on the basis of, for example, instructor data. The instructor data is, for example, a data set in which the target trajectory TR, which is a correct answer that the DNN model MDL2 should output, is associated with the risk region RA as an instructor label (also referred to as a target). That is, the instructor data is a data set in which the risk region RA that is input data and the target trajectory TR that is output data are combined. The target trajectory TR, which is the correct answer, may be, for example, the target trajectory that passes the mesh having the lowest risk potential p, which is less than the threshold Th, among the plurality of meshes contained in the risk region RA. In addition, the target trajectory TR, which is the correct answer, may be, for example, an actual trajectory of a vehicle driven by a driver in a certain risk region RA.

The target trajectory generating part 146 inputs the risk region RA calculated by the risk region calculating part 144 to each of the rule based models MDL1 and the DNN models MDL2, and generates the target trajectory TR on the basis of the output result of each of the models MDL to which the risk region RA is input.

Figure 9:
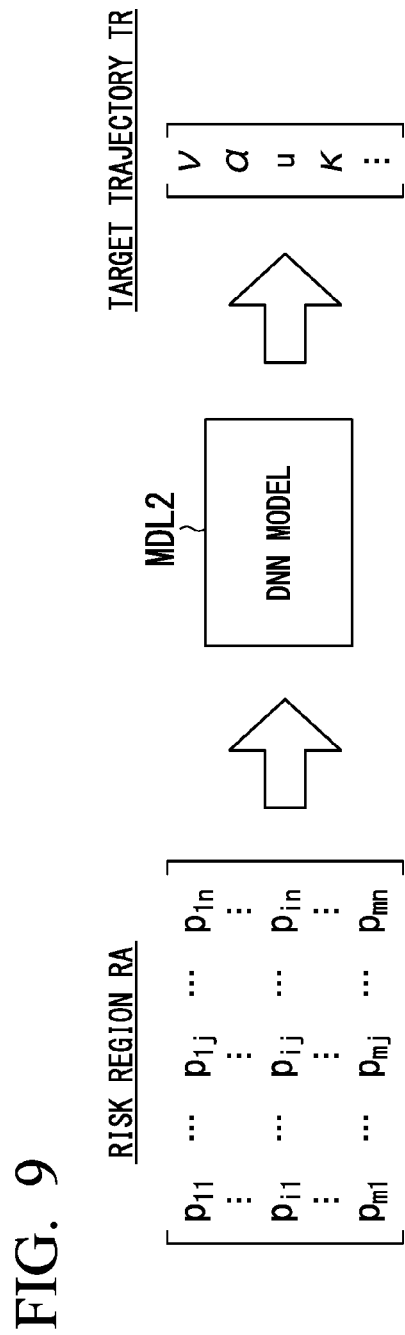
FIG. 9 is a view schematically showing a generating method of a target trajectory.

FIG. 9 is a view schematically showing a generating method of the target trajectory TR. For example, the target trajectory generating part 146 inputs a vector or a tensor representing the risk region RA to the DNN model MDL2 when the certain DNN model MDL2 is selected. In the example shown, the risk region RA is represented as a second-order tensor with m rows and n columns. The model MDL to which the vector or the tensor representing the risk region RA is input outputs the target trajectory TR. The target trajectory TR is represented by, for example, the vector or the tensor including a plurality of elements such as a target speed v, a target acceleration $\alpha$, a displacement amount u of steering, and a curvature $\kappa$ of a trajectory.

Figure 10:
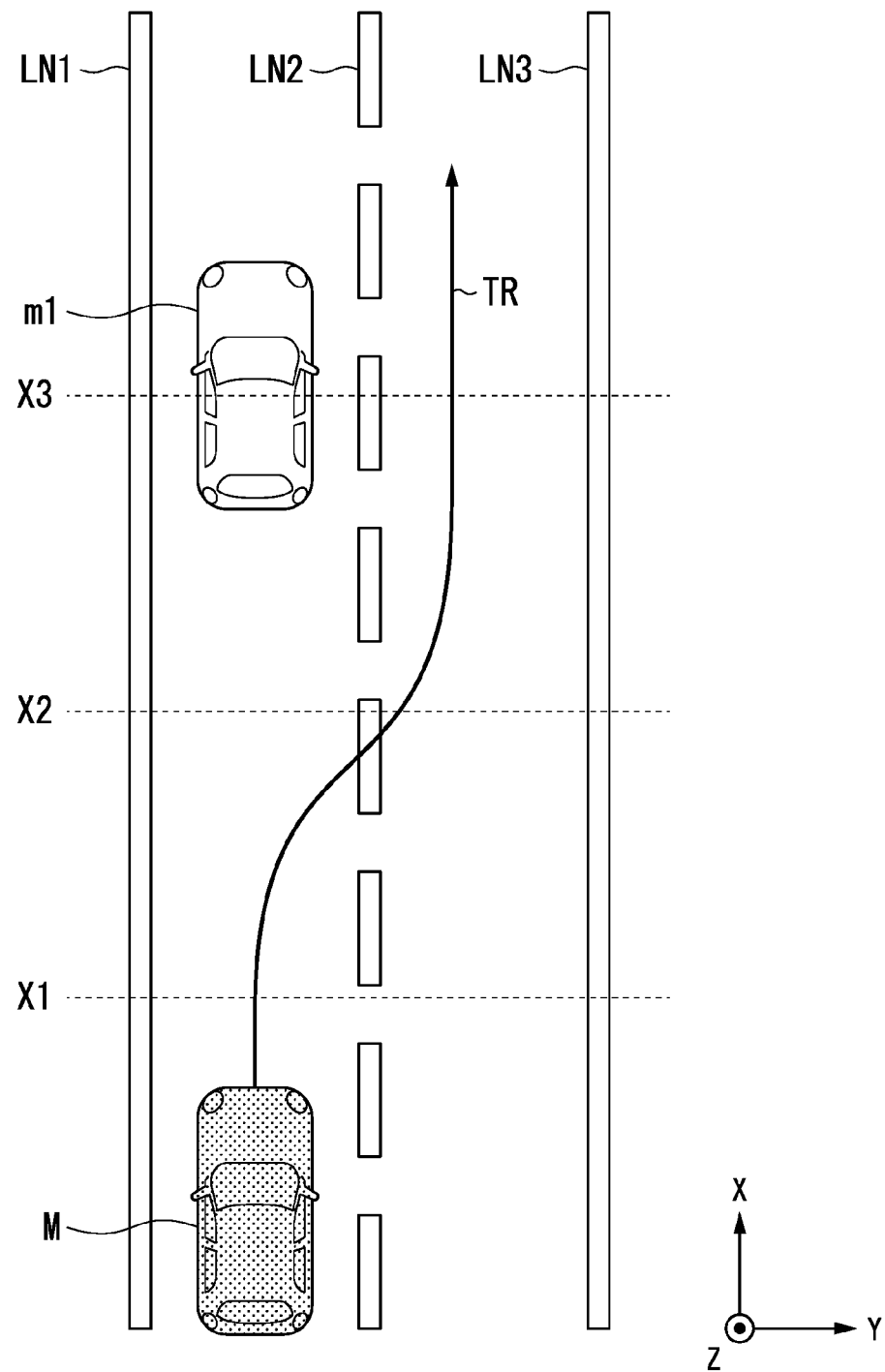
FIG. 10 is a view showing an example of a target trajectory output from a model.

FIG. 10 is a view showing an example of the target trajectory TR output by the model MDL. Like the example shown, since the risk potential p around the preceding vehicle m1 is increased, the target trajectory TR is generated to avoid it. As a result, the host vehicle M changes the lane to a neighboring lane partitioned by road marking lines LN2 and LN3, and overtakes the preceding vehicle m1.

Returning to the description of FIG. 2, the second controller 160 controls the traveling driving power output device 200, the brake device 210, and the steering device 220 such that the host vehicle M passes through the target trajectory TR generated by the target trajectory generating part 146 on time. The second controller 160 includes, for example, a first acquisition part 162, a speed controller 164 and a steering controller 166. The second controller 160 is an example of "a driving controller."

The first acquisition part 162 acquires the target trajectory TR from the target trajectory generating part 146, and stores the acquired target trajectory TR in a memory of the storage 180.

The speed controller 164 controls one or both of the traveling driving power output device 200 and the brake device 210 on the basis of the speed element (for example, the target speed v, the target acceleration $\alpha$, or the like) included in the target trajectory TR stored in the memory.

The steering controller 166 controls the steering device 220 according to the position element included in the target trajectory stored in the memory (for example, a curvature x of the target trajectory, a displacement amount u of the steering according to the position of the trajectory point, or the like).

Processing of the speed controller 164 and the steering controller 166 is realized by, for example, a combination of feedforward control and feedback control. As an example, the steering controller 166 combines and executes the feedforward control according to the curvature of the road in front of the host vehicle M and the feedback control on the basis of the separation from the target trajectory TR.

The traveling driving power output device 200 outputs traveling driving power (torque) to driving wheel in order to cause the vehicle to travel. The traveling driving power output device 200 includes, for example, a combination of an internal combustion engine, an electric motor, and a gearbox, and a power electronic control unit (ECU) configured to control them. The power ECU controls the configuration according to the information input from the second controller 160 or the information input from the driving operator 80.

The brake device 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the second controller 160 or the information input from the driving operator 80 such that a brake torque according to the braking operation is output to the wheels. The brake device 210 may include a mechanism configured to transmit a hydraulic pressure, which is generated by an operation of the brake pedal included in the driving operator 80 to the cylinder via the master cylinder as a backup. Further, the brake device 210 is not limited to the above-mentioned configuration and may be an electronically controlled hydraulic brake device configured to control an actuator according to the information input from the second controller 160 and transmit a hydraulic pressure of the master cylinder to the cylinder.

The steering device 220 includes, for example, a steering ECU and an electric motor. The electric motor changes an orientation of a steered wheel by, for example, applying a force to a rack and pinion mechanism. A steering ECU drives the electric motor and changes an orientation of the steered wheel according to the information input from the second controller 160 or the information input from the driving operator 80.

[Processing Flow]

Figure 11:
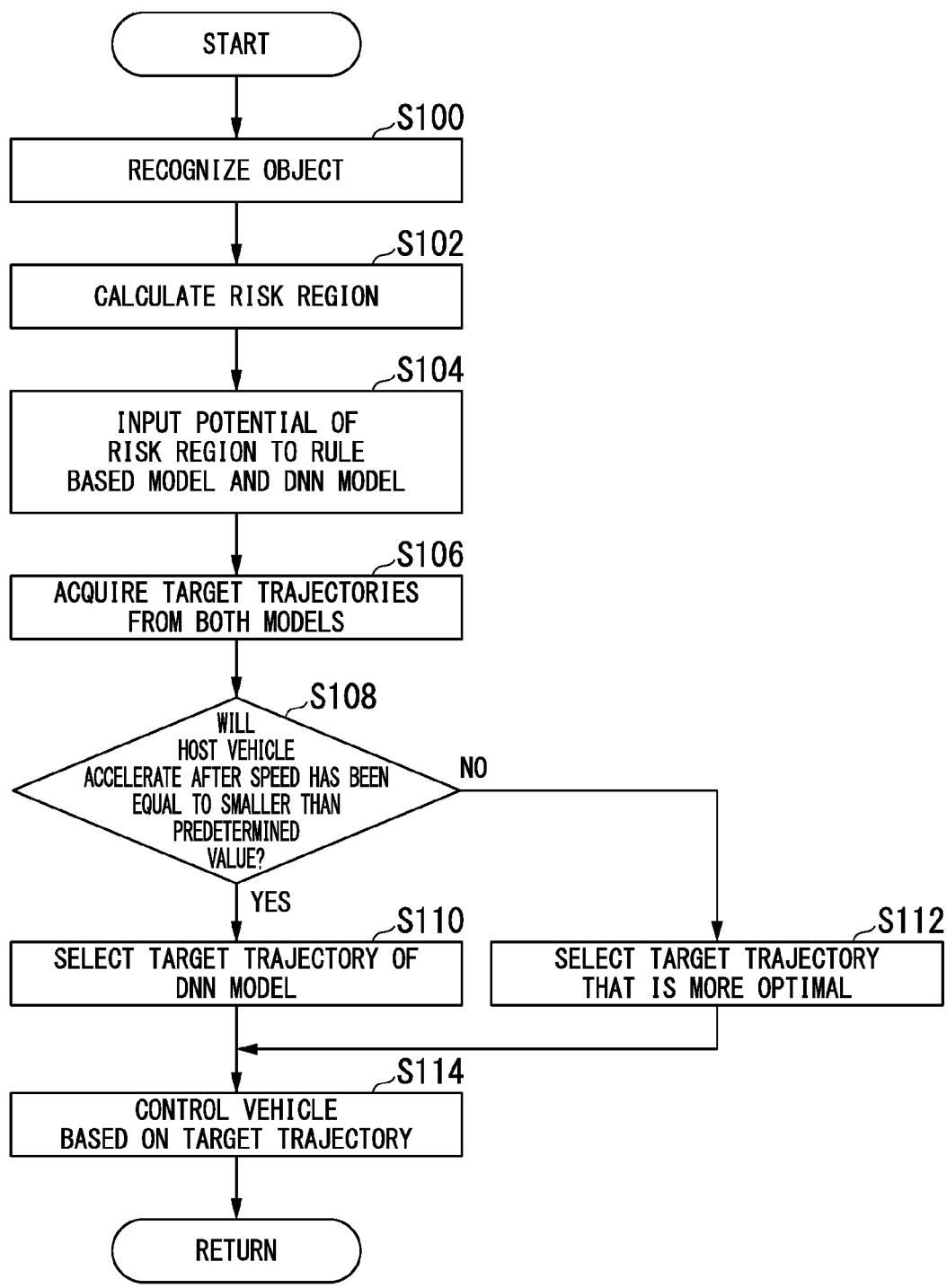
FIG. 11 is a flowchart showing an example of a series of processing flows by an automatic driving control device according to the embodiment.

Hereinafter, a series of processing flows of the automatic driving control device 100 according to the embodiment will be described using a flowchart. FIG. 11 is a flowchart showing an example of a series of processing flows of the automatic driving control device 100 according to the embodiment. Processing of the flowchart may be repeatedly performed at predetermined time intervals, for example.

First, the recognition part 130 recognizes an object present on a road along which the host vehicle M is traveling (step S100). The object may be various objects such as a road marking line on the road, a pedestrian, and an oncoming vehicle, as described above.

Next, the risk region calculating part 144 calculates the risk region RA on the basis of a position or a type of the road marking line, or a position, a speed, an orientation, or the like, of another vehicle therearound (step S102).

For example, the risk region calculating part 144 divides a previously determined range into a plurality of mesh squares and calculates the risk potential p for each of the plurality of mesh squares. Then, the risk region calculating part 144 calculates a vector or a tensor corresponding to the risk potential p with respect to each mesh square as the risk region RA. Here, the risk region calculating part 144 normalizes the risk potential p.

Next, the target trajectory generating part 146 inputs the risk region RA calculated by the risk region calculating part 144 to each of the rule based models MDL1 and the DNN models MDL2 (step S104).

Next, the target trajectory generating part 146 acquires the target trajectory TR from the rule based models MDL1 and simultaneously acquires the target trajectory TR from the DNN models MDL2 (step S106). Hereinafter, the target trajectory TR acquired from the rule based model MDL1 is referred to as "a first target trajectory TR1" and the target trajectory TR acquired from the DNN model MDL2 is referred to as "a second target trajectory TR2."

Next, the target trajectory generating part 146 determines whether the host vehicle M is accelerated within a predetermined range after a speed of the host vehicle M becomes equal or smaller than a predetermined value in both a first condition in which driving of the host vehicle M is automatically controlled based on the first target trajectory TR1 and a second condition in which driving of the host vehicle M is automatically controlled based on the second target trajectory TR2 (step S108). The predetermined value may be, for example, 0 [km/h], or may be a speed of about several [km/h] at which the host vehicle M can be considered to have stopped. The predetermined range may be, for example, a range about 0 to several [G] with reference to an acceleration due to gravity such that a sudden acceleration is not applied to an occupant in the host vehicle M. That is, the target trajectory generating part 146 may determine whether the host vehicle M is accelerating within a range in which an excessive acceleration would not be applied to the occupant after the host vehicle M temporarily stops both under the first condition and under the second condition.

For example, the target trajectory generating part 146 may determine whether the host vehicle M will accelerate within the predetermined range after the speed of the host vehicle M has been equal to or smaller than the predetermined value with reference to the target speed v or the target acceleration α included as the speed element for each of the first target trajectory TR1 and the second target trajectory TR2.

Figure 12:
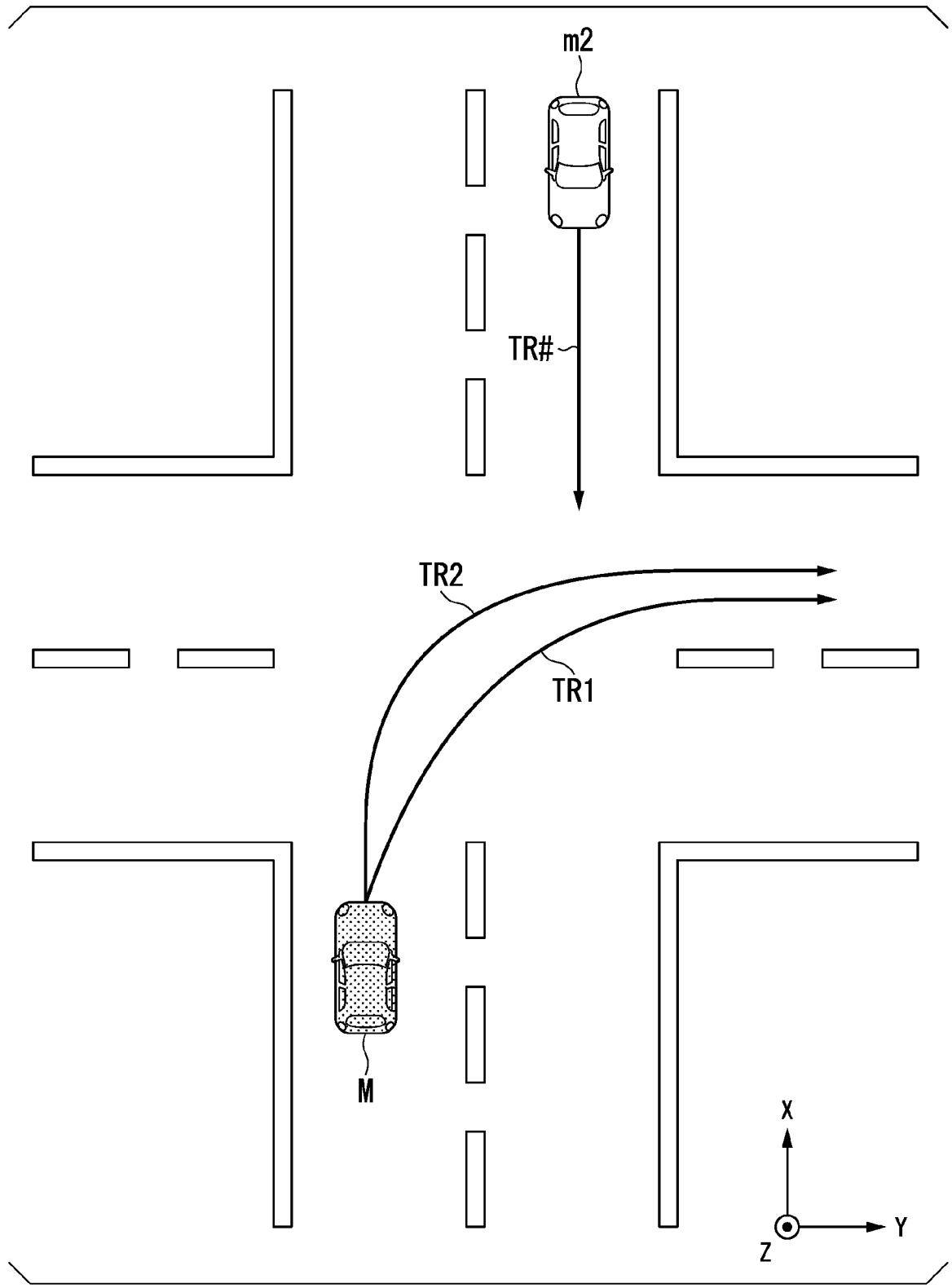
FIG. 12 is a view showing an example of a situation that a host vehicle can encounter.

FIG. 12 is a view showing an example of a situation that the host vehicle M can encounter. In a case the host vehicle M turns right at the crossroads shown, it is necessary for the host vehicle M to travel automatically without obstructing the progress of an oncoming vehicle m2. For example, when the host vehicle M reaches the crossroad earlier than the oncoming vehicle m2, the automatic driving control device 100 causes the host vehicle M to enter the crossroad while decelerating, and temporarily stops the host vehicle M there until the oncoming vehicle m2 passes through the crossroad. Then, the automatic driving control device 100 causes the host vehicle M to turn right while accelerating while the oncoming vehicle m2 passes through the crossroad. That is, in a situation like in this crossroads, the host vehicle M can be accelerated within the predetermined range after the speed of the host vehicle M has become equal to or smaller than the predetermined value.

In this case, the recognition part 130 predicts a future trajectory TR# along which the recognized object will progress. For example, when the recognized object is the oncoming vehicle m2 and the turn indicator light of the oncoming vehicle m2 is not blinking, the recognition part 130 predicts a trajectory in which the oncoming vehicle m2 will progress in a straight line as a future trajectory TR # of the oncoming vehicle m2.

Then, the target trajectory generating part 146 determines whether the future trajectory TR # of the oncoming vehicle m2 predicted by the recognition part 130 crosses both the first target trajectory TR1 and the second target trajectory TR2. In a case the future trajectory TR # of the oncoming vehicle m2 crosses both the first target trajectory TR1 and the second target trajectory TR2, the target trajectory generating part 146 determines that the host vehicle M will accelerate within the predetermined range after the speed of the host vehicle M was equal to or smaller than the predetermined value.

Returning to description of the flowchart of FIG. 11, the target trajectory generating part 146 selects the second target trajectory TR2 from the first target trajectory TR1 and the second target trajectory TR2 when it is determined that the host vehicle M will accelerate within the predetermined range after the speed of the host vehicle M has been equal to or smaller than the predetermined value (step S110).

Meanwhile, the target trajectory generating part 146 selects the target trajectory TR that is more optimal from the first target trajectory TR1 and the second target trajectory TR2, when it is determined that the host vehicle M will not accelerate within the predetermined range after the speed of the host vehicle M has been equal to or smaller than the predetermined value (step S112).

For example, the target trajectory generating part 146 may evaluate the target trajectory TR from the viewpoint of smoothness of the target trajectory TR and gentleness of the acceleration, and select the target trajectory TR with a higher evaluation as the optimal target trajectory TR. More specifically, the target trajectory generating part 146 may select the target trajectory TR with the smallest curvature x and the smallest target acceleration α as the optimal target trajectory TR. Further, selection of the optimal target trajectory TR is not limited thereto and may be performed in consideration of another viewpoint or the like.

Next, the second controller 160 controls at least one of the speed and the steering of the host vehicle M on the basis of the target trajectory TR selected by the target trajectory generating part 146 (step S114). Accordingly, processing of the flowchart is terminated.

Figure 13:
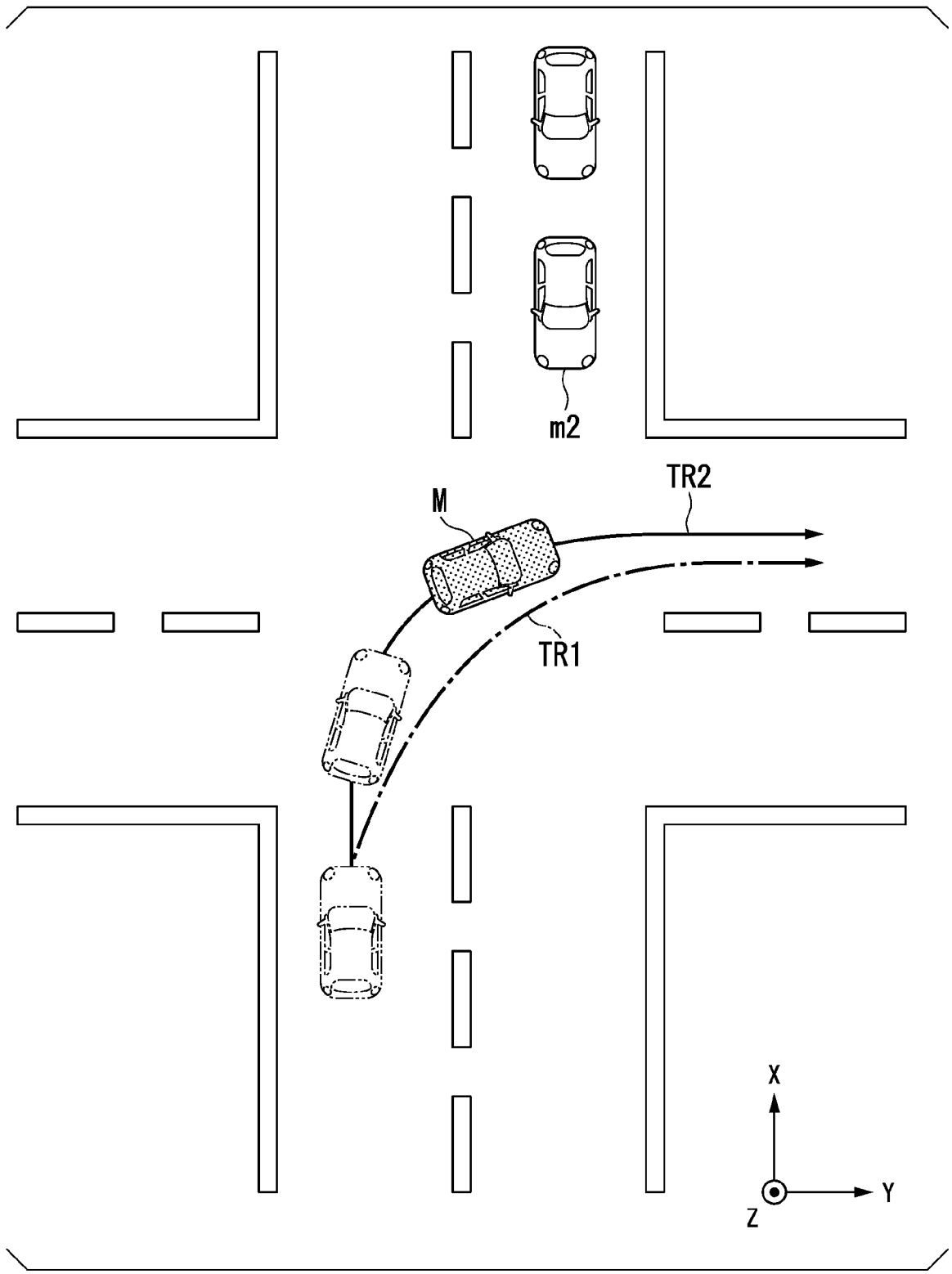
FIG. 13 is a view showing an example of a situation in which driving of a host vehicle is controlled on the basis of the target trajectory.

FIG. 13 is a view showing an example of a situation in which driving of the host vehicle M is controlled on the basis of the target trajectory TR. In the situation shown, since the host vehicle M reaches the crossroad earlier, the host vehicle M will accelerate within the predetermined range after the speed of the host vehicle M has been equal to or greater than the predetermined value. For this reason, the second target trajectory TR2 is selected instead of the first target trajectory TR1.

As described above, the first target trajectory TR1 is the target trajectory TR output by the rule based model MDL1, and the second target trajectory TR2 is the target trajectory TR output by the DNN model MDL2.

It is conceivable that driving of the host vehicle M be controlled on the basis of the first target trajectory TR1. In this case, since the first target trajectory TR1 is derived on the basis of the rule group, driving of the host vehicle M is controlled while following the rule such as the host vehicle M will turn right when the TTC between the oncoming vehicle m2 and the host vehicle M is equal to or greater than a threshold. In this case, if there are many oncoming vehicles m2, it is conceivable that the host vehicle will not be able to turn right and have to remain in the crossroads for a long time.

Meanwhile, it is assumed that driving of the host vehicle M is controlled on the basis of the second target trajectory TR2. In this case, since the second target trajectory TR2 is derived by the CNN, the RNN, or the like, that has learned tendencies of the driving of the driver, even in circumstances in which the host vehicle M will be stuck on a rule basis, it is expected that control of driving of the host vehicle M would be able to be performed to overcome such circumstances.

In general, even under the circumstance in which the TTC between the oncoming vehicle m2 and the host vehicle M is less than the threshold, many drivers start turning right in the hope that the oncoming vehicle m2 will decelerate. By setting the trajectory of the vehicle when such a driver manually drives as instructor data of the DNN model MDL2, even when the TTC between the oncoming vehicle m2 and the host vehicle M is less than the threshold, the DNN model MDL2 can output the second target trajectory TR2, which causes the host vehicle M to turn right. In other words, it is expected that the threshold with respect to the TTC between the oncoming vehicle m2 and the host vehicle M (the threshold of the TTC determining whether right turn is possible) would be larger in the DNN model MDL2 than in the rule based model MDL1.

For this reason, in a case the host vehicle M accelerates within the predetermined range after the speed of the host vehicle M has been equal to or smaller than the predetermined value even following either one of the first target trajectory TR1 and the second target trajectory TR2, the second target trajectory TR2 is selected preferentially. As a result, in a situation like a crossroads, it is possible for the host vehicle M to be more smoothly driven automatically.

According to the above-mentioned embodiment, the automatic driving control device 100 recognizes various objects such as road marking lines or oncoming vehicles present round the host vehicle M, and calculates the risk region RA that is a risk region potentially present around the object. Further, the automatic driving control device 100 inputs the risk region RA to both of the rule based models MDL1 and the DNN models MDL2, and generates the target trajectory TR on the basis of the output results of each model. The automatic driving control device 100 automatically controls driving of the host vehicle M on the basis of the target trajectory TR. Here, the automatic driving control device 100 selects the second target trajectory TR2 from the first target trajectory TR1 and the second target trajectory TR2 when the host vehicle M accelerates within the predetermined range after the speed of the host vehicle M has been equal to or smaller than the predetermined value under both of the first condition in which driving of the host vehicle M is controlled based on the first target trajectory TR1 output by the rule based model MDL1 and the second condition in which driving of the host vehicle M is controlled based on the second target trajectory TR2 output by the DNN model MDL2. As a result, in a situation like the crossroad, it is possible to more smoothly control driving of the host vehicle M.

Variant of Embodiment

Hereinafter, a variant of the above-mentioned embodiment will be described. In the above-mentioned embodiment, while the target trajectory generating part 146 has been described as inputting the risk region RA to each of the rule based models MDL1 and the DNN models MDL2 and generating the target trajectory TR on the basis of the output result of each model, it is not limited thereto. For example, the target trajectory generating part 146 may input the risk region RA to a model created based on a method referred to as a model based or a model based design (hereinafter, referred to as a model based model), and thus, may cause the model based model to output the target trajectory TR. The model based model is a model of determining (or outputting) the target trajectory TR according to the risk region RA using an optimization method such as model prediction control (MPC) or the like. The model based model is another example of "a first model."

In addition, the target trajectory generating part 146 may input the risk region RA to a model using another machine learning as a base, for example, a binary tree type model, a game tree type model, a model in which bottom layer neural networks are coupled to each other like a Boltzmann machine, a reinforcement learning model, or a deep reinforcement learning model as a base, and thus, may cause the another machine learning model to output the target trajectory TRmachine learning. The reinforcement learning is, for example, a learning method of performing learning by repeating trial and error or optimizing an evaluation function optimized when the target trajectory TR is provided. The binary tree type model, the game tree type model, the model in which bottom layer neural networks are coupled to each other like a Boltzmann machine, the reinforcement learning model, the deep reinforcement learning model, or the like, is another example of "a second model."

[Hardware Configuration]

Figure 14:
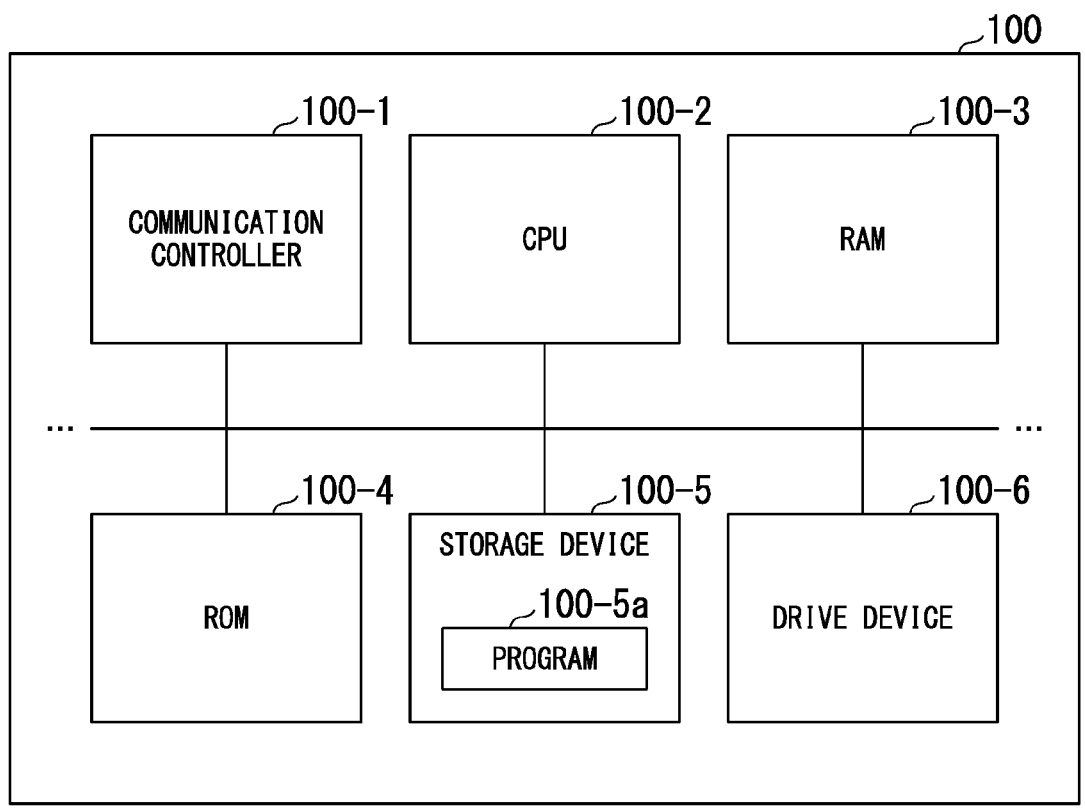
FIG. 14 is a view showing an example of a hardware configuration of an automatic driving control device of the embodiment.

FIG. 14 is a view showing an example of a hardware configuration of the automatic driving control device 100 of the embodiment. As shown, the automatic driving control device 100 has a configuration in which a communication controller 100-1, a CPU 100-2, a RAM 100-3 used as a working memory, a ROM 100-4 configured to store a booting program or the like, a storage device 100-5 such as a flash memory, an HDD, or the like, a drive device 100-6, and the like, are connected to each other by an internal bus or a dedicated communication line. The communication controller 100-1 performs communication with components other than the automatic driving control device 100. A program 100-5a executed by the CPU 100-2 is stored in the storage device 100-5. The program is developed in the RAM 100-3 by a direct memory access (DMA) controller (not shown) or the like, and executed by the CPU 100-2. Accordingly, some or all of the first controller and the second controller 160 are realized.

The above-mentioned embodiment can be expressed as follows.

A vehicle control device is configured to include:
at least one memory in which a program is stored; and
at least one processor,
wherein the processor executes the program to:
recognize an object present around a vehicle:
calculate a region of a risk distributed around the recognized object;
input the calculated region to each of a plurality of models that outputs a target trajectory along which the vehicle is to travel when the region is input, and generate a plurality of target trajectories on the basis of an output result of each of the plurality of models to which the region has been input; and
automatically control driving of the vehicle on the basis of the generated target trajectory,
the plurality of models include a first model which is rule based model or model based model that output the target trajectory from the region, and a second model which is a machine learning based model learned to output the target trajectory when the region is input, and
the second target trajectory is selected from the first target trajectory and the second target trajectory in a case the vehicle accelerates after a speed of the vehicle has been equal to or smaller than a predetermined value under a first condition and in a case the vehicle accelerates after a speed of the vehicle has been equal to or smaller than the predetermined value under a second condition, the first condition being a condition in which driving of the vehicle is controlled based on a first target trajectory that is the target trajectory output by the first model, the second condition being a condition in which driving of the vehicle is controlled based on a second target trajectory that is the target trajectory output by the second model.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control method, comprising:
recognizing an object present around a vehicle;
calculating a region that is divided into a plurality of mesh squares and in which index values associated with levels of a risk distributed around the recognized object are associated with each of the plurality of mesh squares;
inputting the index values associated with the levels of the risk associated with the plurality of mesh squares of the calculated region to each of a plurality of models that output a target trajectory along which the vehicle is to travel when the index values associated with the levels of risk associated with the plurality of mesh squares of the calculated region is input, and generating a plurality of target trajectories on the basis of an output result of each of the plurality of models to which the index values associated with the levels of risk associated with the plurality of mesh squares of the calculated region has been input; and
automatically controlling driving of the vehicle on the basis of one of the generated plurality of target trajectories,
wherein the plurality of models include a first model which is a rule based model or a model that outputs the target trajectory from the index values associated with the levels of risk associated with the plurality of mesh squares of the calculated region, and a second model which is a machine learning based model learned to output the target trajectory when the index values associated with the levels of risk associated with the plurality of mesh squares of the calculated region is input, and
in response to determining that the vehicle is accelerating after a speed of the vehicle has been equal to or smaller than a predetermined value under a first condition, and further in response to determining that the vehicle is accelerating after the speed of the vehicle has been equal to or smaller than the predetermined value under a second condition, selecting the target trajectory from a first target trajectory and a second target trajectory, wherein the first condition represent controlling the vehicle using the first target trajectory output by a first model, and wherein the second condition represents controlling the vehicle using the second target trajectory output by the second model, wherein the first target trajectory represents the trajectory determined based on a rule associated with the rule based model, and the second target trajectory represents the trajectory determined based on the machine learning based model learned when the index values associated with the levels of risk associated with the plurality of mesh squares of the calculated region is input.

2. The vehicle control method according to claim 1, further comprising:

predicting a future trajectory of the recognized object, and
in a case the future trajectory of the recognized object crosses the target trajectory of the vehicle, a determination is made that the vehicle will accelerate after the speed of the vehicle has been equal to or smaller than the predetermined value under the first condition and that the vehicle will accelerate after the speed of the vehicle has been equal to or smaller than the predetermined value under the second condition.

3. The vehicle control method according to claim 1, wherein the predetermined value is zero, and
the second target trajectory is selected among the first target trajectory and the second target trajectory in a case an acceleration of the vehicle is within a predetermined range after the speed of the vehicle has been stopped under the first condition and an acceleration of the vehicle is within a predetermined range after the speed of the vehicle has been stopped under the second condition.

4. A vehicle control device, comprising:
a processor configured to:
recognize an object present around a vehicle;
calculate a region that is divided into a plurality of mesh squares and in which index values associated with levels of a risk distributed around the object are associated with each of the plurality of mesh squares;
input the index values associated with the levels of the risk associated with the plurality of mesh squares of the calculated region to each of a plurality of models that output a target trajectory along which the vehicle is to travel when the index values associated with the levels of risk associated with the plurality of mesh squares of the calculated region is input, and generate a plurality of target trajectories on the basis of an output result of each of the plurality of models to which the index values associated with the levels of risk associated with the plurality of mesh squares of the calculated region has been input; and
automatically control driving of the vehicle on the basis of one of the plurality of target trajectories,
wherein the plurality of models include a first model which is a rule-based model or a model that outputs the target trajectory from the index values associated with the levels of risk associated with the plurality of mesh squares of the calculated region, and a second model which is a machine learning based model learned to output the target trajectory when the index values associated with the levels of risk associated with the plurality of mesh squares of the calculated region is input, and
in response to determining that the vehicle is accelerating after a speed of the vehicle has been equal to or smaller than a predetermined value under a first condition, and in response to determining that the vehicle is accelerating after a speed of the vehicle has been equal to or smaller than a predetermined value under a first condition, and further in response to determining that the vehicle is accelerating after the speed of the vehicle has been equal to or smaller than the predetermined value under a second condition, selecting the target trajectory from a first target trajectory and a second target trajectory, wherein the first condition represent controlling the vehicle using the first target trajectory output by a first model, and wherein the second condition represents controlling the vehicle using the second target trajectory output by the second model, wherein the first target trajectory represents the trajectory determined based on a rule associated with the rule based model, and the second target trajectory represents the trajectory determined based on the machine learning based model learned when the index values associated with the levels of risk associated with the plurality of mesh squares of the calculated region is input.

5. A non-transitory computer-readable storage medium on which a program is stored to execute operations on a computer mounted on a vehicle to:

recognize an object present around the vehicle;

calculate a region that is divided into a plurality of mesh squares and in which index values associated with levels of a risk distributed around the recognized object are associated with each of the plurality of mesh squares;

input the index values associated with the levels of the risk associated with the plurality of mesh squares of the calculated region to each of a plurality of models that output a target trajectory along which the vehicle is to travel when the index values associated with the levels of risk associated with the plurality of mesh squares of the calculated region is input, and generate a plurality of target trajectories on the basis of an output result of each of the plurality of models to which the index values associated with the levels of risk associated with the plurality of mesh squares of the calculated region has been input; and automatically control driving of the vehicle on the basis of one of the generated plurality of target trajectories, wherein the plurality of models include a first model which is a rule based model or a model based model that outputs the target trajectory from the index values associated with the levels of risk associated with the plurality of mesh squares of the calculated region, and a second model which is a machine learning based model learned to output the target trajectory when the index values associated with the levels of risk associated with the plurality of mesh squares of the calculated region is input, and in response to determining that the vehicle is accelerating after a speed of the vehicle has been equal to or smaller than a predetermined value under a first condition, and further in response to determining that the vehicle is accelerating after the speed of the vehicle has been equal to or smaller than the predetermined value under a second condition, selecting the target trajectory from a first target trajectory and a second target trajectory, wherein the first condition represent controlling the vehicle using the first target trajectory output by a first model, and wherein the second condition represents controlling the vehicle using the second target trajectory output by the second model, wherein the first target trajectory represents the trajectory determined based on a rule associated with the rule based model, and the second target trajectory represents the trajectory determined based on the machine learning based model learned when the index values associated with the levels of risk associated with the plurality of mesh squares of the calculated region is input.

* * * * *